United States Patent
Yu

(10) Patent No.: US 8,238,480 B2
(45) Date of Patent: Aug. 7, 2012

(54) ADAPTIVE SELF-QUIETER SUPPRESSION FOR OFDM WIRELESS COMMUNICATION SYSTEMS

(75) Inventor: Xiaoyong Yu, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1341 days.

(21) Appl. No.: 11/867,819

(22) Filed: Oct. 5, 2007

(65) Prior Publication Data

US 2009/0092203 A1    Apr. 9, 2009

(51) Int. Cl.
*H04L 27/00* (2006.01)
*G01S 13/08* (2006.01)
*G01S 13/58* (2006.01)

(52) U.S. Cl. ......... 375/326; 375/219; 375/295; 375/316

(58) Field of Classification Search .................. 375/219, 375/147, 148, 229, 240.26–240.27, 285, 375/284, 295, 316, 324, 346; 342/104, 107, 342/116, 128, 118, 133, 196, 147
See application file for complete search history.

(56) References Cited

U.S. PATENT DOCUMENTS

| | | | |
|---|---|---|---|
| 5,331,293 A | | 7/1994 | Shepherd et al. |
| 6,384,589 B1 | | 5/2002 | Gumm et al. |
| 6,757,344 B2 | | 6/2004 | Carleton |
| 7,027,530 B2 * | | 4/2006 | McFarland et al. ........... 375/341 |
| 7,099,397 B2 | | 8/2006 | Lee et al. |
| 7,113,548 B2 | | 9/2006 | Tanaka et al. |
| 7,289,765 B2 * | | 10/2007 | Okada et al. .................... 455/45 |
| 2005/0059366 A1 | | 3/2005 | Choi et al. |
| 2005/0156780 A1 * | | 7/2005 | Bonthron et al. ............. 342/107 |
| 2006/0087461 A1 | | 4/2006 | Danzig et al. |
| 2006/0093019 A1 | | 5/2006 | Gaikwad et al. |
| 2006/0281425 A1 * | | 12/2006 | Jungerman ................. 455/183.2 |
| 2008/0101212 A1 * | | 5/2008 | Yu et al. ........................ 370/208 |

FOREIGN PATENT DOCUMENTS

EP    1648093 A1    4/2006

OTHER PUBLICATIONS

IEEE Std. 802.16-204 (revision of IEEE Std. 802.16-2001), IEEE Standard for Local and metropolitan area networks, Part 16: Air Interface for Fixed Broadband Wireless Access Systems, IEEE Computer Society and the IEEE Microwave Theory and Techniques Society, IEEE WirelessMAN 801.16, Sponsored by the LAN/MAN Standards Committee, Oct. 1, 2004, Print: SH95246, Section 8.1.3.2.

* cited by examiner

*Primary Examiner* — Sam K Ahn
*Assistant Examiner* — Linda Wong

(57) ABSTRACT

Various embodiments to provide cancellation techniques that can be used to address the self-quieter problem are described. For example, a receiver that includes a tone selector and a self-quieter suppressor is provided. The tone selector (202) determines and selects a self-quieter corrupted tone from a frequency domain signal that exhibits a self-quieter. The self-quieter suppressor (203) determines an initial phase, an angular speed and an amplitude estimate for the frequency domain self-quieter. The suppressor then generates a reconstructed frequency domain self-quieter using the initial phase, the angular speed and the amplitude estimate and subtracts the reconstructed frequency domain self-quieter from the corrupted tone to produce a self-quieter suppressed tone to replace the corrupted tone. Such an approach can realize a significant reduction in processing and complexity, as compared to known alternatives, making it an attractive and cost-effective solution for dealing with the self-quieter problem.

8 Claims, 6 Drawing Sheets

ADAPTIVE SELF-QUIETER SUPPRESSION FOR OFDM WIRELESS COMMUNICATION SYSTEMS

FIELD OF THE INVENTION

The present invention relates generally to wireless communications and, in particular, to providing adaptive self-quieter suppression for OFDM wireless communication systems.

BACKGROUND OF THE INVENTION

In radio frequency (RF) communications, it is inevitable that undesired frequency signals reach a receiver's RF mixer, mixed into desired signal bandwidth, and cause receiver sensitivity degradation. For example, in a radio base station, a 768 MHz sinusoidal clock signal may be fed to a transmitter DAC (digital to analog converter) where it is divided by 2 and used to generate a square wave clock signal at 384 MHz. If the receiver is tuned to exactly 3.456 GHz, the harmonic of ninth order of the square wave, which is also a sinusoid at 3.456 GHz, radiates from the digital section to the receiver RF front end circuitry that resides in the same board and gets mixed down to the receiver intermediate frequency (IF) (e.g., 468 MHz) after going through the receiver mixer. In the output of a Fast Fourier transform (FFT) of the baseband signal, this harmonic component, which is called a self-quieter, will peak in the frequency domain and may wipe out a number of tones in Orthogonal frequency division multiplexing (OFDM) systems. FIG. 1 is a graph that shows a self-quieter observed in an OFDM base station receiver. Graph 100 depicts RSSI receive signal strength indicator (RSSI) in dB verse tone index. Some hardware methods such as adding extra shielding or foam may mitigate this self-quieter problem. However, they are too expensive for ordinary implementations.

Some other relevant techniques for addressing the self-quieter problem are known in the literature. Examples of these include: Gaikwad, Rohit V. and Trachewsky, Jason A., "Spur harmonic canceller for RF band clock", EP1648093 A1, Broadcom Corporation, 2005, (See also in US Patent Application US 20060093019A1); Choi, Won-Joon, Gilbert, Jeffrey, M., Wang, Yi-Hsiu and Zhang, Xiaoru, "Spur Mitigation Techniques", US20050059366A1, Atheros Communications, Inc., 2005; and J. I. Danzig, K. L. Miller and H. R. Whitehead, "System and Method for Spur Cancellation", US20060087461A1, Broadcom Corporation, 2005. Such techniques utilize frequency mixing and notching filters in order to perform time-domain spur cancellation. However, for various broadband OFDM systems like WiMax, 3GPP (3rd Generation Partnership Project) Long Term Evolution (LTE) and those of 3GPP2 (3rd Generation Partnership Project 2), time-domain spur cancellation requires intensive computation that is proportional to the sampling rate. (The standards groups corresponding the systems mentioned may be contacted via http://www.wimaxforum.org/, http://www.3gpp.org/, and http://www.3gpp2.com/, respectively.) Thus, there is a need for additional cancellation techniques to address the self-quieter problem, which are more practical for use in OFDM systems.

Specific embodiments of the present invention are disclosed below with reference to FIGS. 2-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams and/or the logic flow diagrams above are described and shown with reference to specific signaling exchanged and/or specific functionality performed in a specific order, some of the signaling/functionality may be omitted or some of the signaling/functionality may be combined, sub-divided, or reordered without departing from the scope of the claims. Thus, unless specifically indicated, the order and grouping of the signaling/functionality depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments to provide cancellation techniques that can be used to address the self-quieter problem are described. For example, a receiver that includes a tone selector and a self-quieter suppressor is provided. The tone selector determines and selects a self-quieter corrupted tone from a frequency domain signal that exhibits a self-quieter. The self-quieter suppressor determines an initial phase, an angular speed and an amplitude estimate for the frequency domain self-quieter. The suppressor then generates a reconstructed frequency domain self-quieter using the initial phase, the angular speed and the amplitude estimate and subtracts the reconstructed frequency domain self-quieter from the corrupted tone to produce a self-quieter suppressed tone to replace the corrupted tone. Such an approach can realize a significant reduction in processing and complexity, as compared to known alternatives, making it an attractive and cost-effective solution for dealing with the self-quieter problem.

Figure 1:
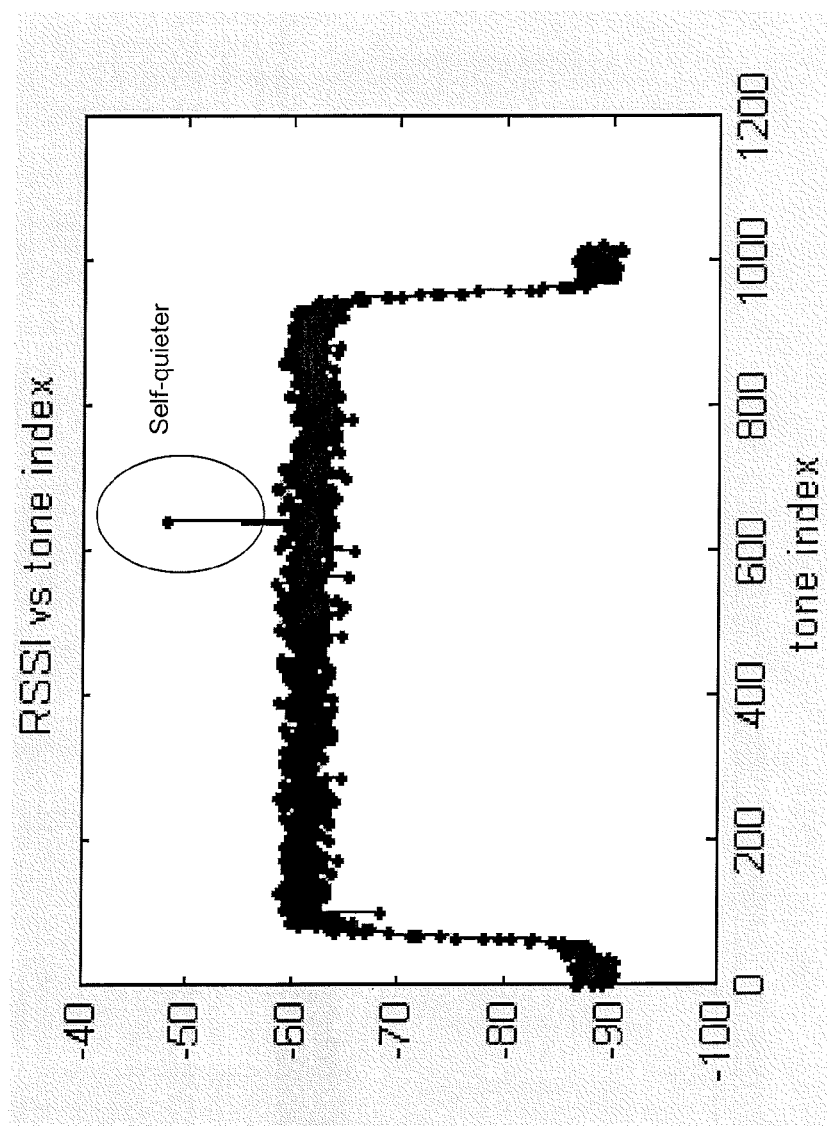
FIG. 1 is a graph of RSSI verses tone index depicting an example of a self-quieter that may be observed in an OFDM base station.
Figure 2:
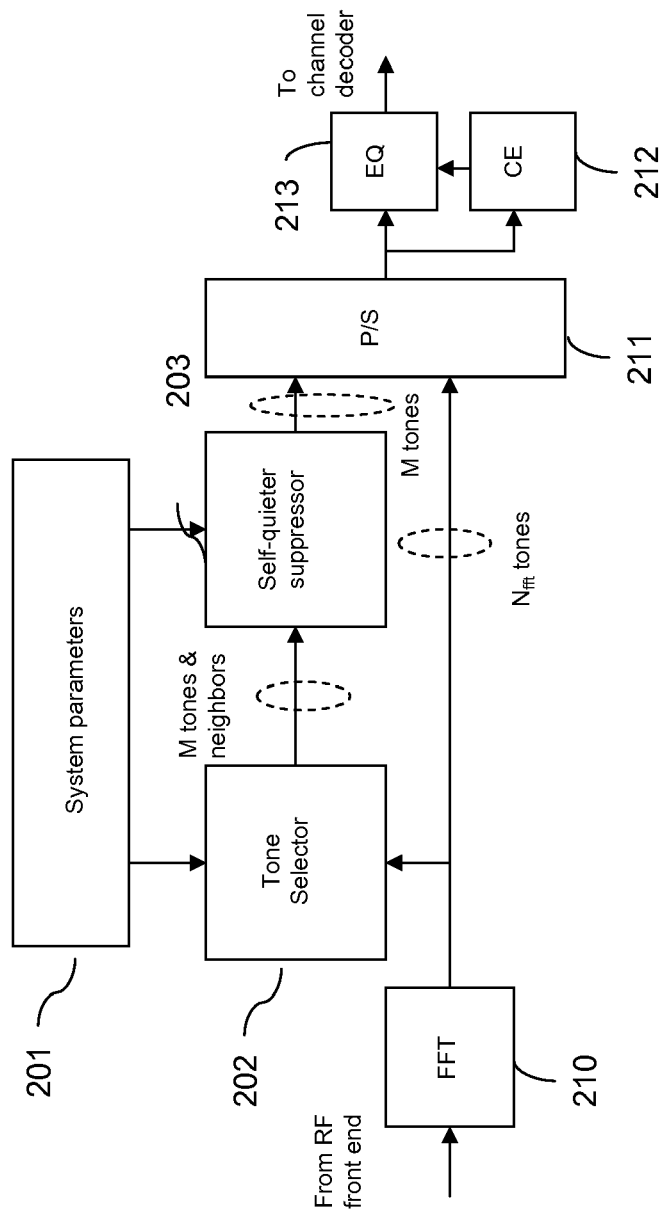
FIG. 2 is a block diagram depiction of an OFDM baseband receive processor with a self-quieter suppressor, in accordance with multiple embodiments of the present invention.

The disclosed embodiments can be more fully understood with reference to FIGS. 2-6. FIG. 2 is a block diagram depiction of an OFDM baseband receive processing unit with a self-quieter suppressor, in accordance with multiple embodiments of the present invention. As depicted in diagram 200, the OFDM receive processor includes some components that are typical in OFDM receivers. The FFT (fast Fourier transform) 210, the P/S (parallel to serial) 211, the CE (channel estimation) 212 and the EQ (equalizer) 213 are all based on known components of typical OFDM receivers. In general, receive processing units are well-known. For example, such processing units are known to potentially comprise basic components such as, but neither limited to nor necessarily requiring, digital signal processors (DSPs), microprocessors, microcontrollers, memory devices, application-specific integrated circuits (ASICs), field programmable gate arrays (FPGAs) and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams. For example, newly-presented components such as tone selector 202 and self-quieter suppressor 203, embodiments of which are described below, may be substantially implemented using components such as a DSP and a FPGA.

Block 201 represents one or more storage devices for system parameters. Depending on the embodiment, the stored system parameters may include parameters such as FFT size $N_{fft}$, self-quieter frequency $f_{self-Q}$, carrier frequency $f_c$ and OFDM symbol interval $T_{symbol}$. In time division duplex (TDD) embodiments, block 201 also represents one or more counting devices to count the number of TDD frames.

Tone selector 202 determines which tones are corrupted by the self-quieter and selects these affected tones. Given the relative self-quieter frequency $f_{relative}$ and the tone spacing $f_{tone}$, (which is the sampling frequency divided by FFT size $N_{fft}$), tone selector 202 may determine the self-quieter location in terms of tone index as follows:

$$x = \frac{f_{relative}}{f_{tone}}$$

$$\hat{x} = \text{round}(x)$$

$$y = \hat{x} + \frac{N_{fft}}{2} + 1$$

$$\delta = \hat{x} - x$$

$$m = \begin{cases} [y-1, y] & \text{if } \delta > 0 \\ [y, y+1] & \text{if } \delta < 0 \\ y & \text{if } \delta = 0 \end{cases}$$

where $\hat{x}$ denotes the nearest integer close to x, and the index m indicates where suppression should be performed. In most embodiments, two tones are selected for a self-quieter, due to the fact that the power of a self-quieter decreases quickly in the frequency domain such that its impact on neighbor tones of tone m is negligible. In some embodiments, a number of neighbor tones of tone m are also identified for amplitude estimation associated with the self-quieter. The tones used for this amplitude estimation should belong to the same user as that of tone m.

Self-quieter suppressor 203 rebuilds the original tones corrupted by the self-quieter. In P/S 211 then, all the original tones corrupted by the self-quieter are replaced by the output of self-quieter suppressor 203. The P/S 211 output is then fed to the conventional channel estimate 212 and equalizer 213 for data demodulation.

Figure 3:
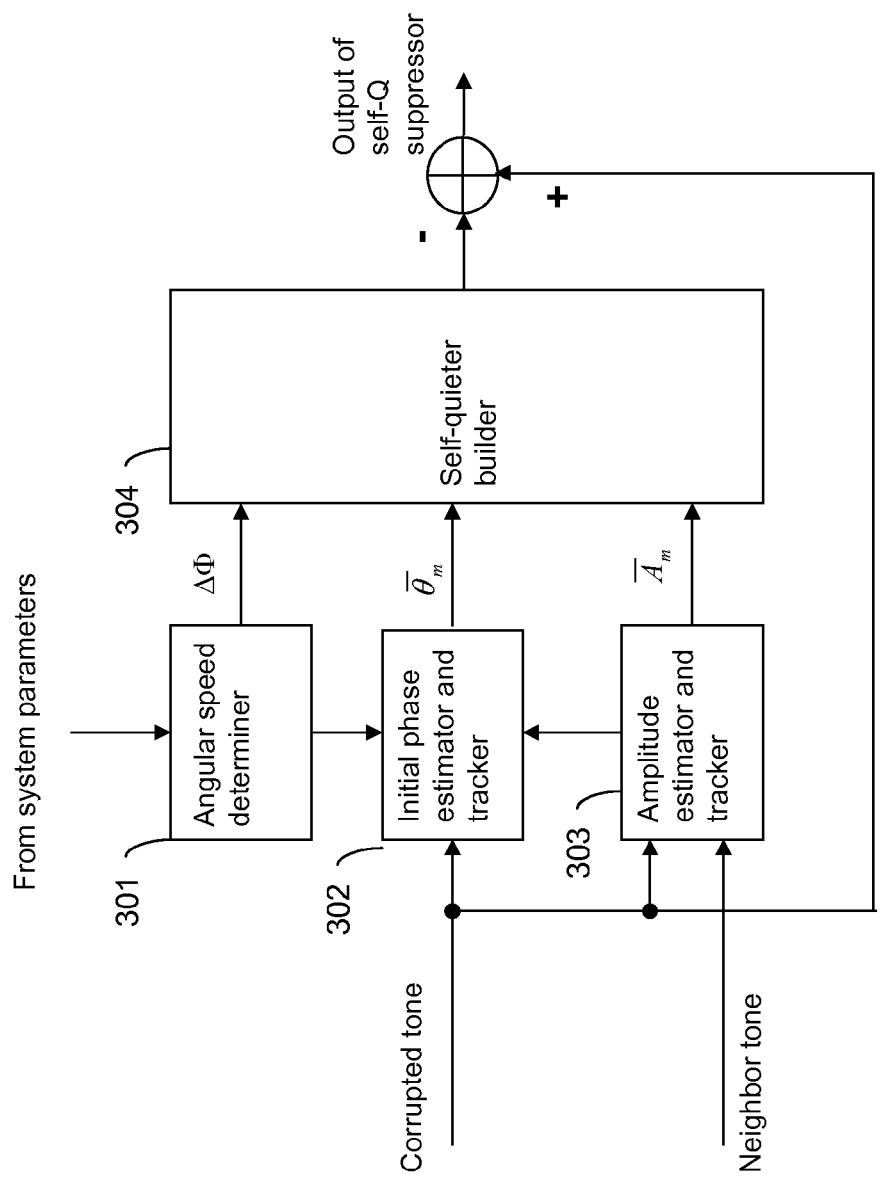
FIG. 3 is a block diagram depiction of a self-quieter suppressor, in accordance with multiple embodiments of the present invention.

FIG. 3 is a more detailed depiction of a self-quieter suppressor, such as self-quieter suppressor 203, in accordance with various embodiments of the present invention. As depicted in FIG. 3, self-quieter suppressor 203 includes angular speed determiner 301, initial phase estimator and tracker 302, amplitude estimator and tracker 303 and self-quieter builder 304. Using one or more system parameters, angular speed determiner 301 determines an angular speed of the self-quieter for self-quieter builder 304. In some embodiments, the angular speed of the self-quieter across the OFDM symbol index is determined as $$\delta\phi = 2\pi \times (f_{relative} \times T_{frame} - \text{round}(f_{relative} \times T_{frame}))$$

For example, in an embodiment that supports a TDD mode of WiMax, $T_{frame} = 0.005$ second.

Figure 4:
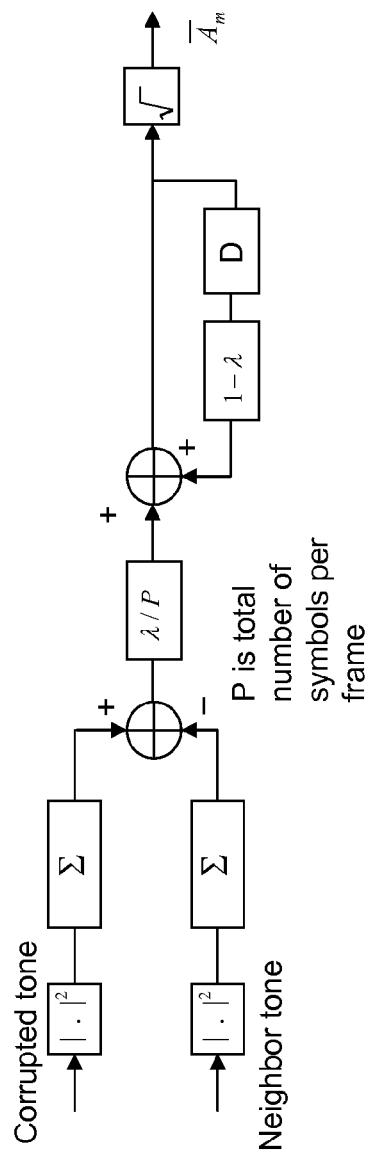
FIG. 4 is a block diagram depiction of an amplitude estimator and tracker as part of a self-quieter suppressor, in accordance with multiple embodiments of the present invention.

Using one or more of the tones from tone selector 202, amplitude estimator and tracker 303 determines a self-quieter amplitude for self-quieter builder 304. FIG. 4 is a more detailed depiction of an amplitude estimator and tracker, such as amplitude estimator and tracker 303, in accordance with various embodiments of the present invention. Thus, in these embodiments, the self-quieter amplitude on tone m is calculated as depicted in FIG. 4, which is based on the average power difference between the self-quieter corrupted tone m and its neighbor tone (e.g., as identified by tone selector 202) for amplitude estimation. The estimate for each TDD frame is passed through a low-pass filter to reduce variation as shown in FIG. 4. Mathematically, they are expressed as $$A_m^2 = \frac{1}{P}\sum_{p=1}^{P} |\tilde{S}_m(p)|^2 - \frac{1}{P}\sum_{p=1}^{P} |\tilde{S}_d(p)|^2$$

where $d \neq m$ where P is a total number of OFDM symbols in a frame, $\tilde{S}_m(p)$ is a received signal on tone m within a pth OFDM symbol, m represents a self-quieter corrupted tone and d represents a neighbor tone of m. Also, $$\overline{A}_m^2(n) = \lambda A_m^2 + (1-\lambda)\overline{A}_m^2(n-1)$$

$$\overline{A}_m = \sqrt{\overline{A}_m^2(n)}$$

here $\lambda$ takes a value between 0 and 1, for example, $\lambda = 0.2$; n is the current frame number.

Figure 5:
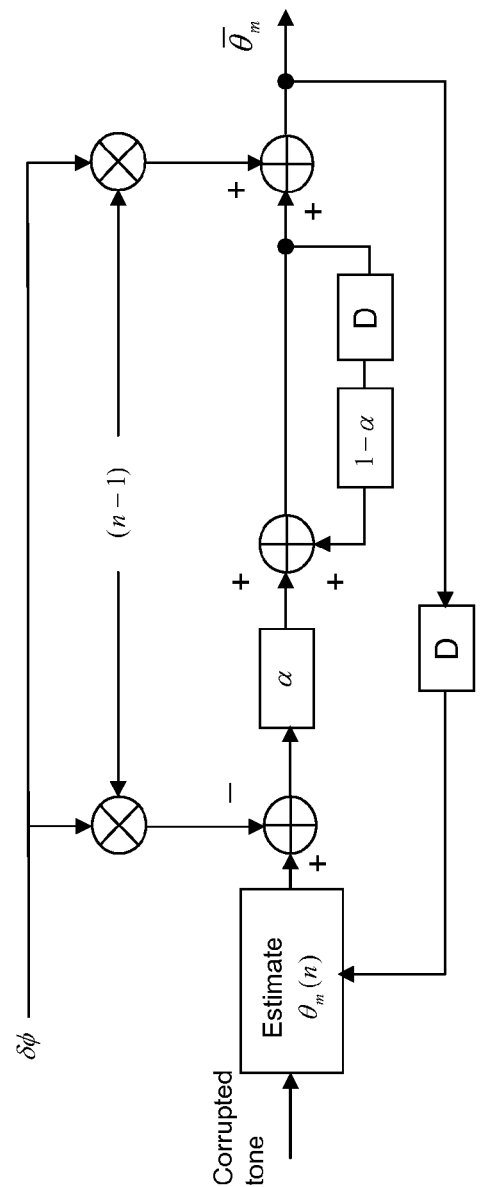
FIG. 5 is a block diagram depiction of an initial phase estimator and tracker as part of a self-quieter suppressor, in accordance with multiple embodiments of the present invention.

Using one or more of the tones from tone selector 202, initial phase estimator and tracker 302 determines an initial phase of the self-quieter for self-quieter builder 304. FIG. 5 is a more detailed depiction of an initial phase estimator and tracker, such as initial phase estimator and tracker 302, in accordance with various embodiments of the present invention. Thus, in these embodiments, the initial phase of the self-quieter is estimated and tracked as shown in FIG. 5, where an estimate for an individual frame is calculated on corrupted tone m based on a metric whose minimum value corresponds to the estimate. The metric is defined as $$\Gamma_m^{(k)} = \sum_{p=1}^{P} \left| \tilde{S}_m(p) - \overline{A}_m e^{j\overline{\theta}_m^{(k)}} e^{j\Delta\Phi p} \right|^2$$

$p = 1, 2, \ldots, P$ is OFDM symbol index where k represents the kth predetermined search point of the initial phase $\theta_m^{(k)}$ on tone m. During acquisition mode, in which self-quieter suppressor 203 is trying to estimate all the parameters of the self-quieter such as angular speed, amplitude and initial phase, the search range of $\theta_m^{(k)}$ is around a circle. For example, if the search resolution is 1 degree, then the number of metrics $\Gamma_m^{(k)}$ is 360 corresponding to 360 degrees of $\theta_m^{(k)}$ around a circle, so k=1, 2, . . . , 360. During receive mode, in which suppressor 203 is trying to remove the self-quieter from the received signal and when parameter tracking is required, three search points for $\theta_m^{(k)}$ is sufficient, for example phase $\theta_m^{(1)} = \overline{\theta}_m - 1$, $\theta_m^{(2)} = \overline{\theta}_m$ and $\theta_m^{(3)} = \overline{\theta}_m + 1$, which are the right and left neighbors of $\overline{\theta}_m$ and $\overline{\theta}_m$ itself, are searched. In this tracking mode, the number of metrics is 3, i.e., k=1, 2 and 3. This can significantly reduce the computational complexity associated with metric calculation and the minimum value search. An initial phase estimate of the current frame is the value of $\theta_m^{(k)}$ corresponding to the minimum value of the metric $\Gamma_m^{(k)}$, for example, during receive mode, for frame n, $\theta_m(n) = \theta_m^{(2)}$ if $\Gamma_m^{(2)} < \Gamma_m^{(1)}$ and $\Gamma_m^{(2)} < \Gamma_m^{(3)}$. Another intermediate phase of the frame n is defined as $\phi_m(n) = \theta_m(n) - (n-1) \times \delta\phi$. Then $\phi_m(n)$ is passed to a low-pass filter, i.e., $$\overline{\phi}_m(n) = \alpha\phi_m(n) + (1-\alpha)\overline{\phi}_m(n-1)$$

Finally, the initial phase used in self-quieter builder 304 for frame n is given by $$\overline{\theta}_m = \mathrm{mod}((n-1) \times \delta\phi + \overline{\phi}_m(n), 2\pi)$$

It should be noted that the frame number counter can be set to zeros when $$\mathrm{mod}((n_{frame} - 1) \times \delta\phi, 2\pi) = 0$$

This is favorable in practical implementations.

Finally, the self-quieter on tone m is rebuilt by self-quieter builder 304 using $\Delta\Phi$, $\overline{A}_m$ and $\overline{\theta}_m$ and subtracted from the original signal on the same tone across all OFDM symbols in a frame, that is $$Y_m(p) = \tilde{S}_m(p) - \overline{A}_m e^{j\overline{\theta}_m} e^{j\Delta\Phi p} \quad p = 1, 2, \ldots, P$$

where $Y_m(p)$ denotes output of the self-quieter suppressor on tone m for OFDM symbol p. In P/S 211 then, all the original tones corrupted by the self-quieter are replaced by the output of self-quieter suppressor 203. The P/S 211 output is then fed to the conventional channel estimate 212 and equalizer 213 for data demodulation.

Various embodiments described above, in general, involve the self-quieter being reconstructed in the frequency domain using estimated amplitude, frequency and initial phase. This reconstructed self-quieter is then subtracted from the received signal at particular OFDM sub-carriers rather than across the full OFDM bandwidth. Such an approach can realize a significant reduction in processing and complexity, as compared to known alternatives, making it an attractive and cost-effective solution for dealing with the self-quieter problem. Moreover, the approach is particularly attractive for systems utilizing TDD mode operation, since it utilizes frequency-domain cancellation techniques.

Figure 6:
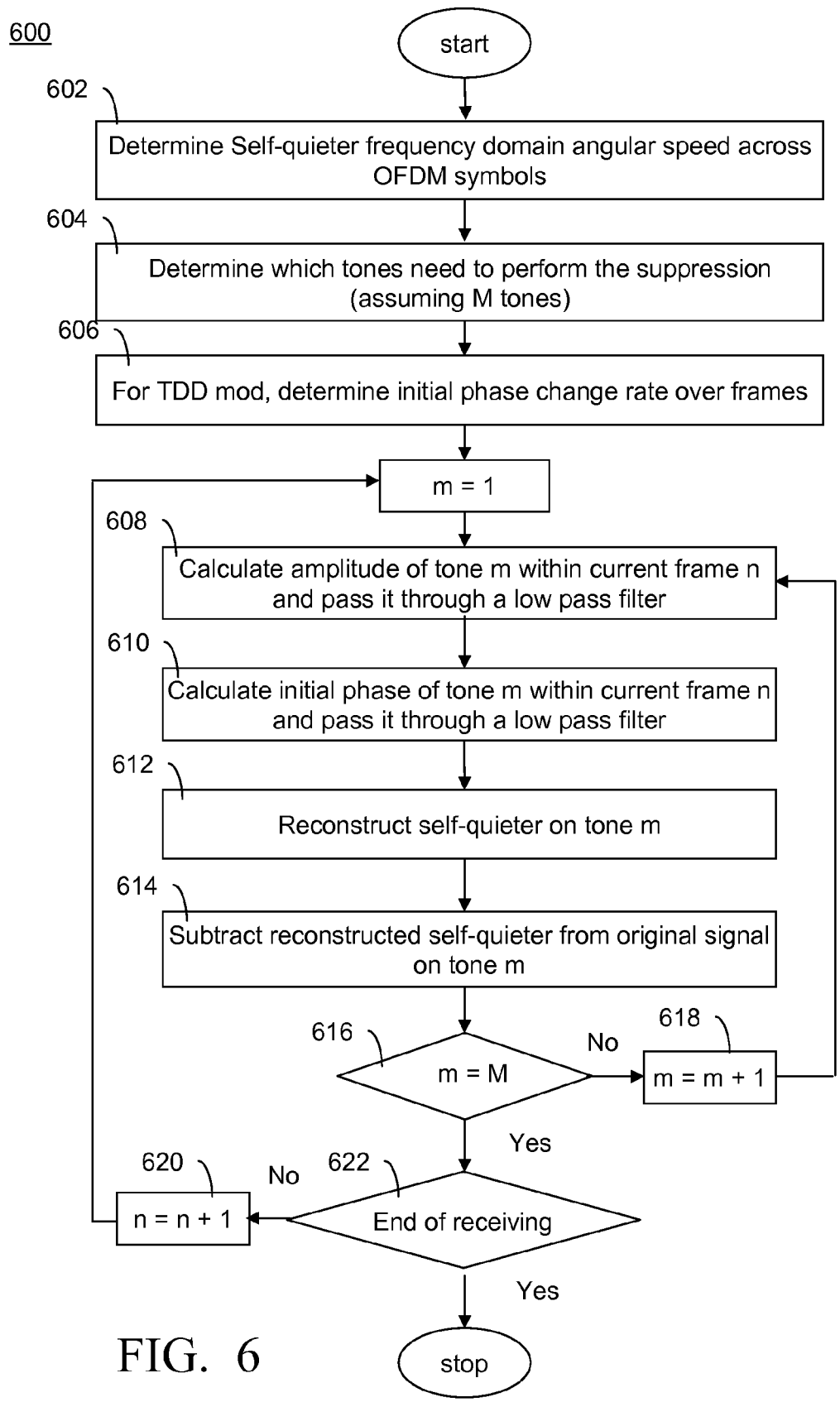
FIG. 6 is a logic flow diagram that depicts detailed functionality performed by an OFDM receiver, in accordance with certain embodiments of the present invention.

FIG. 6 is a logic flow diagram that depicts detailed functionality performed by an OFDM receiver, in accordance with certain embodiments of the present invention. Logic flow 600 begins with the receiver determining (602) a self-quieter frequency-domain angular speed across OFDM symbols. The receiver also determines (604) which tone or tones are corrupted by the self-quieter and selects these affected tones. For purposes of illustration, it will be assumed that M tones are selected. If the receiver is operating in a TDD mode, it determines (606) an initial phase change rate over frames. (For frequency division duplex operation, the initial phase change rate is 0.)

Logic flow 600 now begins to iterate over the M tones selected, starting with the first tone, m=1. The receiver calculates (608) the amplitude and an initial phase (610) of tone m within the current frame n and passes it through a low pass filter. The receiver then reconstructs (612) the self-quieter for tone m and subtracts (614) the reconstructed self-quieter from the original signal on tone m. If M is greater than 1, then m is incremented (616) and the iteration continues until m=M (616). This has the effect of rebuilding the original tones corrupted by the self-quieter and replacing the corrupted tones with them. Logic flow 600 then continues with the next frame (620) until the receiver stops (622) receiving frames.

One of skill in the art will appreciate that various modifications and changes may be made to the specific embodiments described above with respect to FIGS. 2-6 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for adaptive self-quieter suppression comprising:
    selecting a self-quieter corrupted tone from a frequency domain signal that exhibits a self-quieter;
    determining an initial phase, an angular speed and an amplitude estimate for the self-quieter in the frequency domain;
    determining a phase change rate over a time division duplex (TDD) frame interval;
    determining a current initial phase of a current TDD frame by searching a finite number of values of the initial phase;
    determining an intermediate phase that is a difference between the current initial phase and the phase change rate times a number of past TDD frames;
    applying a low-pass filter to the intermediate phase to reduce variation;
    determining the initial phase for the frequency domain self-quieter by summing the low-pass filtered intermediate phase and the phase change rate times the number of past TDD frames;
    generating a reconstructed frequency domain self-quieter using the initial phase, the angular speed and the amplitude estimate; and
    replacing the self-quieter corrupted tone by a self-quieter suppressed tone, wherein the self-quieter suppressed tone is the self-quieter corrupted tone minus the reconstructed frequency domain self-quieter.

2. The method of claim 1, wherein the angular speed is determined based on a known self-quieter frequency, a known OFDM system carrier frequency and a known OFDM symbol interval.

3. The method of claim 1, wherein determining the amplitude estimate of the frequency domain self-quieter comprises determining the amplitude estimate based on an average power difference between the corrupted tone and a neighbor tone of the corrupted tone and
applying a low-pass filter to reduce variation.

4. The method of claim 1, further comprises
selecting at least one additional self-quieter corrupted tone from the frequency domain signal in addition to the self-quieter corrupted tone.

5. A receiver comprising:
    a tone selector adapted to determine a self-quieter corrupted tone from a frequency domain signal that exhibits a self-quieter;
    a self-quieter suppressor
        adapted to determine an initial phase, an angular speed and an amplitude estimate for the frequency domain self-quieter,
        adapted to determine a phase change rate over a time division duplex (TDD) frame interval,
        adapted to determine a current initial phase of a current TDD frame by searching a finite number of values of the initial phase,
        adapted to determine an intermediate phase that is a difference between the current initial phase and the phase change rate times a number of past TDD frames,
        adapted to apply a low-pass filter to the intermediate phase to reduce variation, and
        adapted to determine the initial phase for the frequency domain self-quieter by summing the low-pass filtered intermediate phase and the phase change rate times the number of past TDD frames,
        adapted to generate a reconstructed frequency domain self-quieter using the initial phase, the angular speed and the amplitude estimate, and
        adapted to subtract the reconstructed frequency domain self-quieter from the corrupted tone to produce a self-quieter suppressed tone to replace the corrupted tone.

6. The receiver of claim 5, wherein the self-quieter suppressor is further adapted to determine the angular speed based on a known self-quieter frequency, a known OFDM system carrier frequency and a known OFDM symbol interval.

7. The receiver of claim 5, wherein the self-quieter suppressor is further
    adapted to determine the amplitude estimate based on an average power difference between the corrupted tone and a neighbor tone of the corrupted tone and
    adapted to apply a low-pass filter to reduce variation.

8. The receiver of claim 5, wherein the self-quieter suppressor is further
    adapted to select at least one additional self-quieter corrupted tone from the frequency domain signal in addition to the self-quieter corrupted tone.

* * * * *